Patented May 17, 1938

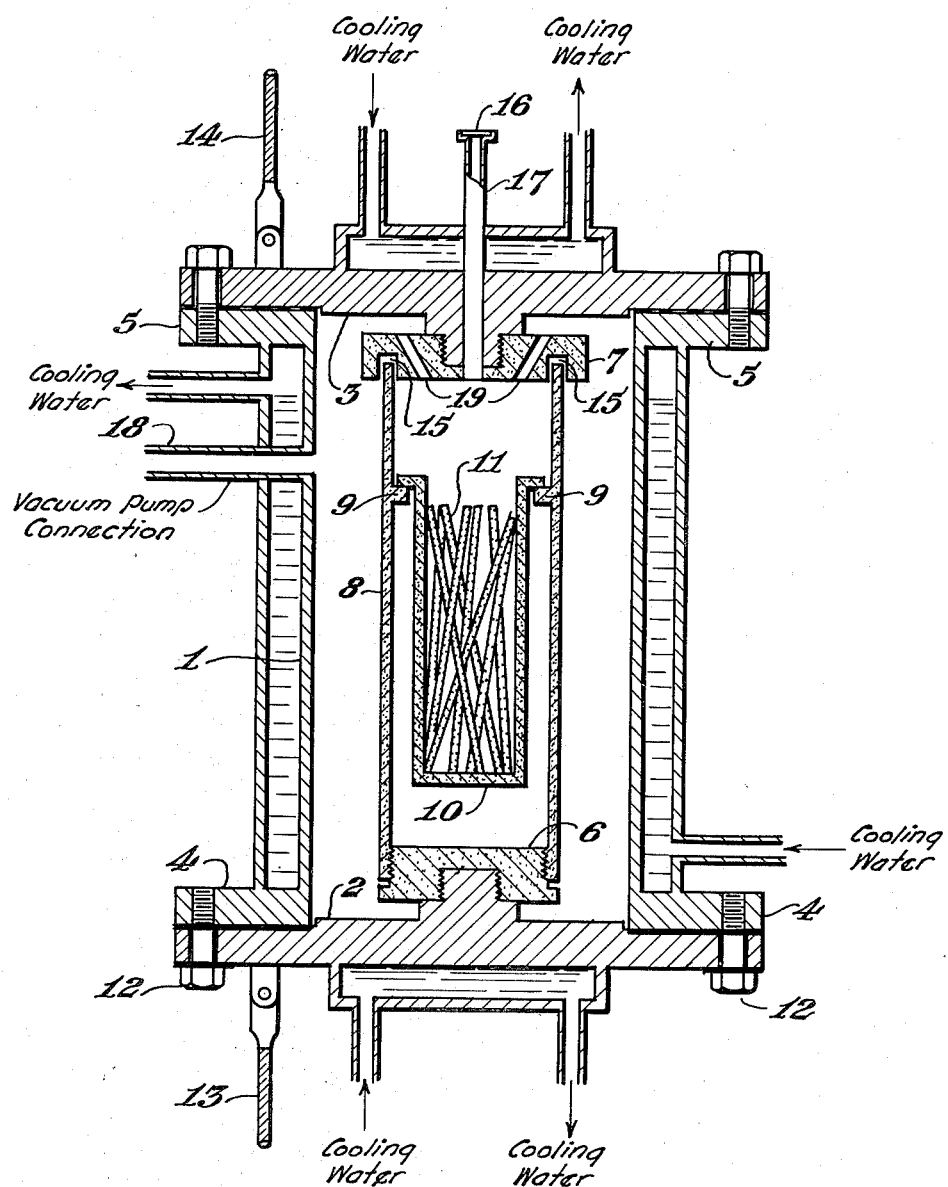

2,117,497

UNITED STATES PATENT OFFICE 2,117,497

METHOD OF PURIFYING CARBON OR GRAPHITE

James S. Owens, John S. Peake, and Richard G. Fowler, Midland, Mich., assignors to The Dow Chemical Company, Midland, Mich., a corporation of Michigan Application August 27, 1937, Serial No. 161,294

3 Claims. (Cl. 176—133)

The invention relates to a method of treating carbon or graphite, and more particularly concerns a method of obtaining graphite or carbon electrodes in a highly purified form.

In making spectrum analyses R. Mannkopff and C. Peters, Zeits, f. Physik, 70, 444 (1931), proposed to employ an arc struck between small round electrodes of carbon or graphite, one of the arcing ends having been treated with a solution of the substance to be analyzed. The rays emitted by the arc then include the spectra characteristic of the elements of the substance under investigation. Thus, by examining the rays emitted by the arc, it is possible to determine not only qualitatively, but also quantitatively, certain constituent elements of the substance under investigation, provided, however, the spectra are not masked by those produced by impurities in the electrodes. The presence of extraneous elements in the electrodes renders the investigation of the various rays emitted more difficult, and it is usually impossible to differentiate between the rays which are due to the impurity in the electrodes and those due to the substance being analyzed. Therefore, in order to make spectrum analyses with precision, it is necessary that the carbon or graphite electrodes employed for the arc be of the highest purity, that is, free from any of the elements which may be present in the substance to be analyzed, and preferably free from any element other than carbon.

The commercially available carbon or graphite electrodes, however, are not generally satisfactory for precise spectrum analyses. Even the best obtainable electrodes contain impurities in the amounts from about 0.0015 and 0.002 per cent or more, these being determined as ash when the electrodes are consumed by combustion in air or oxygen. In the main these impurities produce the spectra of the metals: iron, silicon, sodium, calcium, copper and usually magnesium. The amounts of these impurities are often of the same order of magnitude as those to be determined in the analysis. For many investigations, particularly of substances the approximate composition of which is entirely unknown and in which it is desired to determine the presence or absence, as well as the amounts, of the various elements which may be present, especially if some of these be relatively small, the best graphite electrodes now available contain sufficient impurities to conceal the spectra. The need for highly pure electrodes of carbon or graphite which do not produce spectra interfering with those produced in a spectrum analysis is thus apparent.

The principal object of the invention is to provide a method of purifying graphite or carbon electrodes, so as to free them from undesirable elements which may interfere, when the electrodes are employed in spectrum analysis. Other objects and advantages will be apparent from the following detailed description of the invention.

According to the process of the invention carbon or graphite electrodes, in the form of bars, rods, or the like, are subjected to a very high temperature electrical heating under sub-atmospheric pressure for a relatively short time but without the passage of electric current through the electrodes. By this method we have found that the ordinary, as well as the very purest obtainable, graphite or carbon electrodes can be rendered so highly pure as to produce only a negligible amount of ash on being consumed in oxygen or air, and when used for spectrum analyses produce practically no interfering spectra.

The invention, then, consists of the method hereinafter fully described and particularly pointed out in the claims, the annexed drawing and the following description setting forth, however, but one of the various ways in which the principle of the invention may be used.

In said annexed drawing, the single figure illustrates a vertical section of a water-jacketed electric furnace suitable for use in carrying out the invention.

As shown, the furnace comprises a water-jacketed metal cylinder 1 with water-cooled detachable metal heads 2 and 3, which are bolted to the flanged ends 4 and 5, respectively, of the cylinder 1. The detachable head 2 is electrically insulated from the flange 4 and from the head bolts 12 by suitable insulating gaskets, while the detachable head 3 may be bolted to the cylinder as shown without insulating it therefrom. Screwed onto the water-cooled heads 2 and 3 are graphite discs 6 and 7, respectively, which form the supporting ends of a graphite cylinder 8. The annular shoulder 9 near the upper end on the inside of the cylinder 8 forms a support for the container 10 in which the electrodes 11 to be heated are placed. Current leads are provided at 13 and 14 to the heads 2 and 3, respectively, to supply electrical current to the cylinder 8, the upper end of which makes a sliding fit with an annular groove 15 in the graphite disc 7. A window 16 is provided in the end of the tube 17 extending through the head 3 and graphite disc 7, through which an optical pyrometric measurement of the temperature of the furnace charge can be made. A vacuum pump connection 18 is provided for evacuating the furnace and passages 19 are provided through the disc 7 to facilitate the removal of gas from the heated charge.

In using this furnace the upper head 3 is removed to permit placing the electrodes in the container 10, these being loosely stacked therein, and then the head is put into place so that the disc 7 fits down over the upper end of the cylinder 8 with which it makes electrical connection. The head is then bolted down so that it is gas tight. Cooling water is circulated through the water jackets on the cylinder and heads of the furnace and the current is passed through the cylinder 8 from the current leads 13 and 14, while the gases in the furnace are exhausted at the outlet 18. Temperature observations are made by means of an optical pyrometer through the window 16 until the charge 11 of electrodes reaches the desired temperature. The current employed is regulated so as to bring the temperature of the electrodes up to about 2100° C. and preferably to about 2300° C., or higher, and held at this temperature for about 5 to 15 minutes, or more, while exhausting the gases from the furnace. The pressure in the furnace should be reduced well below atmospheric pressure, as for example, to a pressure below about 10 inches of mercury, a pressure below about 2 inches being preferable. It is unnecessary, however, to reduce the pressure below 0.5 inch of mercury. After thus heating the electrodes, the current is turned off and, when the charge has been allowed to cool down, the electrodes are removed from the furnace and are ready to be used.

The following example is illustrative of the operation of the method and the results obtainable. A pair of the purest obtainable graphite rods about ¼ inch in diameter were subjected to the spectrum method of analysis to determine the amount of the impurities therein, the rods, without further treatment, being used to produce the arc spectrum. The spectrum was recorded in the usual manner on a photographic plate. An examination of the plate showed prominent lines corresponding to the spectra of the metals: Fe, Si, Ca, Na, Mg, and Cu, the concentration of the metals being in the order of about 0.0001 to 0.0005 per cent. The rods were then treated according to our method of purification by subjecting them to electrical heating for about 10 minutes without the passage of current through the rods, at a temperature of about 2350° C. in a furnace of the type described above, while maintaining a pressure therein of about 1 inch of mercury. After this treatment, the rods were again used without further treatment to produce an arc spectrum to determine their purity, the spectrum being recorded on a photographic plate as before. An examination of the plate showed that there were now substantially no spectral lines corresponding to the aforementioned elements.

Analysis by chemical methods for ash content of the purified rods indicates that by our method of purification the ash content is so greatly reduced as to be difficult to determine with certainty. This observation is in agreement with the showing of the spectrum analysis, which indicates that the impurities usually found in graphite, if present after our treatment, are so small in amount as not to be revealed in the arc spectrum.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of purifying a carbon or graphite electrode, the step which consists in subjecting the electrode to electrical heating without the passage of current through the electrode at a temperature above about 2100° C. at a pressure below about 10 inches of mercury.

2. In a method of purifying a carbon or graphite electrode, the step which consists in subjecting the electrode to electrical heating without the passage of current through the electrode at a temperature above about 2100° C. at a pressure below about 2 inches of mercury.

3. In a method of purifying a carbon or graphite electrode, the step which consists in subjecting the electrode to electrical heating without the passage of current through the electrode at a temperature above about 2300° C. for from about 5 to 15 minutes at a pressure below about 2 inches of mercury.

JAMES S. OWENS.
JOHN S. PEAKE.
RICHARD G. FOWLER.